United States Patent [19]
Stutsman

[11] Patent Number: 5,878,475
[45] Date of Patent: Mar. 9, 1999

[54] METHOD OF FABRICATING A SPINDLE ASSEMBLY FOR A MACHINE TOOL

[75] Inventor: David A. Stutsman, Huntingburg, Ind.

[73] Assignee: Thermwood Corporation, Dale, Ind.

[21] Appl. No.: 55,178

[22] Filed: Apr. 3, 1998

Related U.S. Application Data

[62] Division of Ser. No. 639,207, Apr. 26, 1996, Pat. No. 5,769,579.

[51] Int. Cl.$^6$ ........................................................ B23P 11/00
[52] U.S. Cl. ........................... 29/434; 29/460; 29/527.2; 264/264; 264/269
[58] Field of Search ..................... 29/898.054, 898.059, 29/898.07, 434, 458, 460, 527.2, 530; 409/230, 231, 235; 264/269, 264

[56] References Cited

U.S. PATENT DOCUMENTS

| | | | |
|---|---|---|---|
| 4,902,176 | 2/1990 | Sugino et al. ........................... | 409/231 |
| 4,997,324 | 3/1991 | Shirai et al. ............................. | 409/231 |
| 5,305,525 | 4/1994 | Susnjara et al. ...................... | 29/898.07 |
| 5,471,724 | 12/1995 | Susnjara et al. ......................... | 409/231 |
| 5,544,990 | 8/1996 | Hardesty .................................. | 409/235 |
| 5,575,318 | 11/1996 | Susnjara .................................... | 29/434 |
| 5,782,586 | 7/1998 | Geissler .................................... | 409/231 |
| 5,782,593 | 7/1998 | Klemont ................................... | 409/231 |
| 5,795,114 | 8/1998 | Schweizer et al. ...................... | 409/578 |

*Primary Examiner*—David P. Bryant
*Attorney, Agent, or Firm*—Lalos & Keegan

[57] ABSTRACT

A spindle assembly for a machine tool generally including a first housing having a bore provided with a lining formed of a structural polymer, a second housing disposed in the first housing bore in sliding engagement with the lining therein, a first spindle journaled in the first housing, a second spindle journaled in the second housing in axial alignment with the first spindle and operatively connected thereto for axial displacement relative thereto and rotational movement therewith and means for displacing the second housing relative to the first housing to correspondingly axially displace the spindles.

6 Claims, 2 Drawing Sheets

METHOD OF FABRICATING A SPINDLE ASSEMBLY FOR A MACHINE TOOL

This application is a divisional of application Ser. No. 08/639,207, filed Apr. 26, 1996, now issued as U.S. Pat. No. 5,769,579.

This invention relates to an improved toolhead assembly for a machine tool. The invention further contemplates a novel spindle assembly and a method of fabricating such a spindle assembly.

BACKGROUND OF THE INVENTION

In machine tools of the type provided with a base member, a worktable fixedly or movably mounted on the base member and a gantry also fixedly or movably mounted on the base member, there usually is provided a toolhead assembly mounted on the gantry. Such machines further are typically provided with servo motors operated by a programmable computer for displacing the worktable or gantry longitudinally relative to the base member or along an x-axis, displacing the toolhead assembly transversely relative to the base member or along a y-axis and displacing a tool carrying spindle assembly usually along a vertical line of travel or along a z-axis to perform various work functions on one or more work pieces loaded onto the worktable.

To increase the flexibility and possibly the productivity of such machines, it has been the practice in the prior art to provide multiple tool availability. This has been accomplished primarily by providing multiple toolhead assemblies, turret type toolhead assemblies or tool changer assemblies on such machines. Providing multiple toolhead assemblies is a costly arrangement, requiring multiple drive motors, frequency converters and spindles. Turret type toolhead assemblies and tool changer assemblies also are costly to produce. It thus has been found to be desirable to provide a toolhead assembly having multiple tool availability which is effective in performance in providing greater flexibility of the machine and increased productivity yet comparatively economical to manufacture.

SUMMARY OF THE INVENTION

The present invention provides for a toolhead assembly particularly suitable for the type of machine tool described, generally comprising a support means mountable on a machine structure, a drive motor having a pair of drive shaft portions, mounted on the support means, a first spindle assembly mounted on the support means, having a first spindle drivingly connected to one of the drive shaft portions of the drive motor, a first housing having a bore provided with a lining formed of a structural polymer, mounted on the support means, a second housing disposed in the first housing bore and displaceable therein in sliding engagement with the bore lining, a second spindle assembly mounted on the second housing, having a second spindle disposed in axial alignment with the first spindle and operatively connected thereto for axial displacement relative thereto and rotational movement therewith, and means for displacing the second housing relative to the first housing to correspondingly axially displace the spindles.

The assembly drivingly connected to the drive motor may be assembled by mounting the first spindle assembly in the first housing, mounting the second spindle assembly in the second housing, applying a release agent on the outer mating surface of the second housing, inserting the second housing with the second spindle assembly mounted thereon into the bore of the first housing so that the second spindle assembly is operatively connected to the first spindle assembly and the outer mating surface of the second housing is spaced from the bore wall of the first housing to provide an annular space, injecting a structural polymer into the annular space between the housings and allowing it to cure, forming a lining adhered to the bore wall of the first housing and providing a bearing surface replicating the outer mating surface of the second housing, and then attaching a displacing means preferably consisting of a pneumatic cylinder assembly with the cylinder portion thereof secured to the first housing and the extendable rod portion thereof secured to the second housing. Preferably, the structural polymer consists of an epoxy based structural polymer having a low coefficient friction, high wear properties, a low abrasion rate and long-term dimensional stability, and is provided with a lubricant such as molybdenum disulfide.

Each of the spindle assemblies preferably are assembled by press-fitting roller bearings onto the spindles, positioning the outer races of the ball bearings of each of the spindles in oversized bearing seats in their respective housings and injecting an epoxy-resin adhesive between the outer races of the bearings and the bearing seats. By forming each of the spindle assemblies in such manner, connecting the spindles together in the bore of the first housing before forming the liner providing the bearing surface of the second housing and then forming the bearing lining for the second housing, the spindles will not only be axially aligned relative to their respective bearings in which they are mounted but also relative to each other.

By providing the type of assembly as described and drivingly connecting it to a drive motor operating a separate tool in a "piggyback" manner, an additional working tool is provided for a machine without the added expense of an additional drive motor and frequency converter or a complicated alternative arrangement such as a tool changer or a turret assembly.

DETAILED DESCRIPTION OF THE PREFERRED EMBODIMENT OF THE INVENTION

Figures 1, 2:
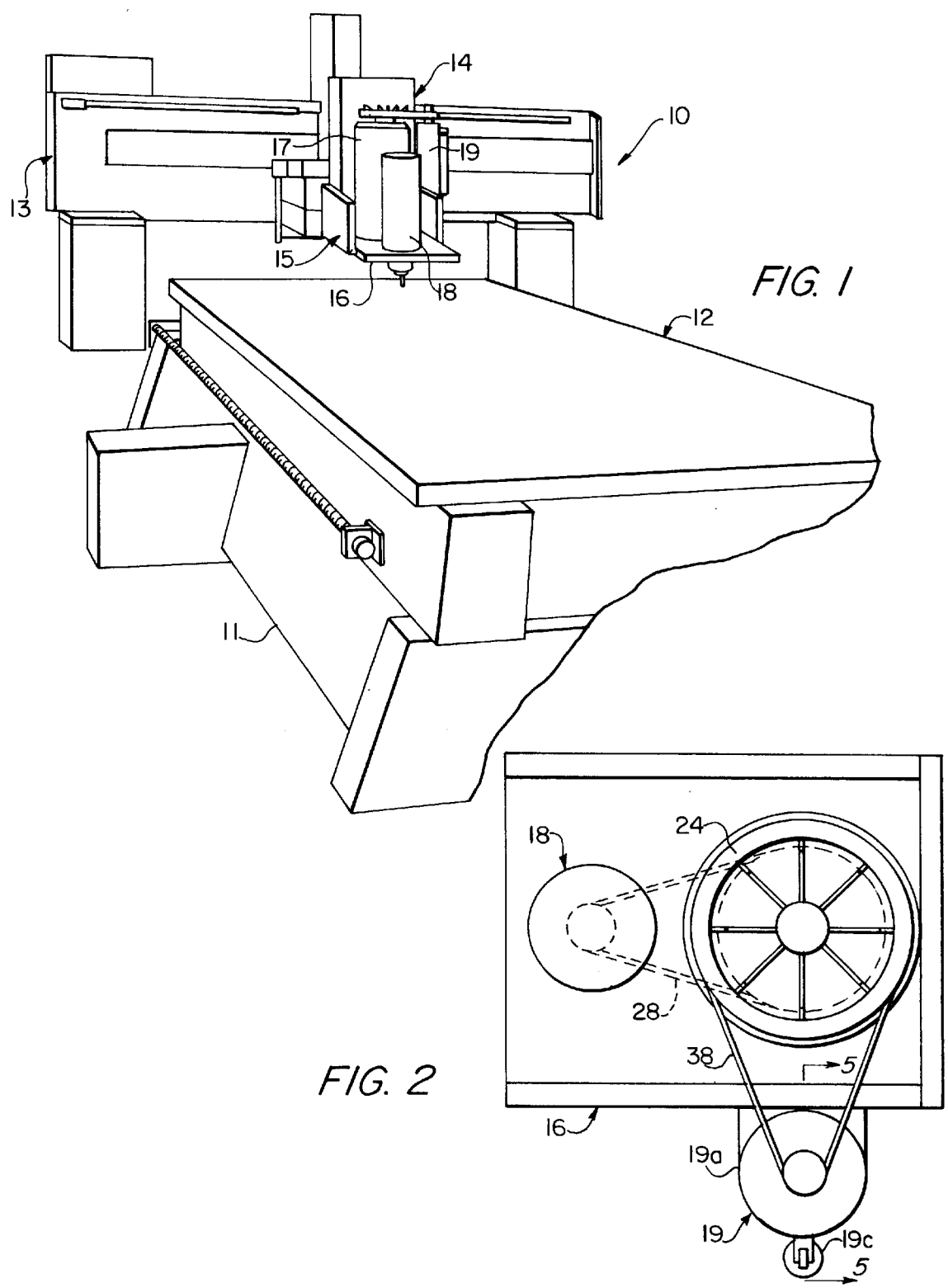
FIG. 1 is a perspective view of a machine tool provided with a toolhead assembly embodying the present invention, having a portion thereof broken away.
FIG. 2 is an enlarged, top plan view of the toolhead assembly shown in FIG. 1.

Referring to FIG. 1 of the drawings, there is illustrated a machine tool 10 operated by a programmable controller for displacing a pair of spindle mounted tools relative to one or more workpieces mounted thereon to provide various work functions. Generally, the machine tool includes a base member 11 provided with a worktable 12 on which one or more workpieces may be mounted, a gantry 13 supported on the base member and displaceable longitudinally or along an x-axis by means of feed screws provided with servo motors operated by the controller, a toolhead support assembly 14 mounted on a cross-piece member of the gantry and displaceable transversely or along a y-axis by means of a feed screw provided with a servo motor operated by the controller, and a toolhead assembly 15 mounted on the toolhead support assembly and displaceable vertically or along a y-axis by means of a feed screw provided with a servo motor also operated by the controller.

Figure 3:
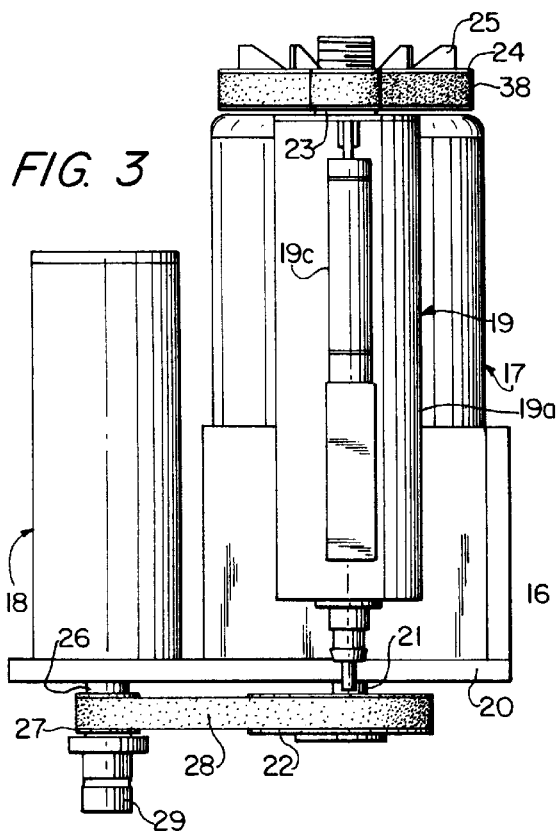
FIG. 3 is a side elevational view of the toolhead assembly shown in FIG. 2.
Figure 4:
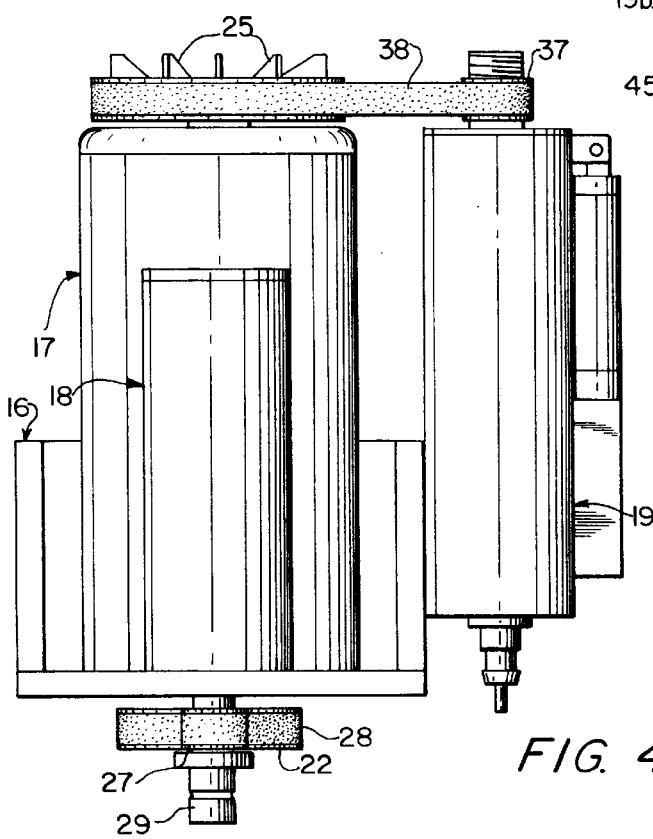
FIG. 4 is a front elevational view of the toolhead assembly shown in FIGS. 2 and 3.

As best shown in FIGS. 2 through 4, toolhead assembly 15 includes a support member 16 mounted on toolhead support assembly 14 and displaceable vertically relative thereto, a drive motor 17 mounted on the support member, a first spindle assembly 18 mounted on the support member ahead of the drive motor and having an axis disposed parallel to the axis of the drive motor and a second spindle assembly 19 disposed laterally of the drive motor and also having an axis disposed parallel to the axis of the drive motor. The drive motor consists of a conventional electric motor and is mounted on a bottom plate 20 of the support member. The motor further is provided with a downwardly projecting drive shaft portion 21 extending through an opening in bottom plate 20 and being provided with a drive pulley 22, and an upwardly projecting shaft portion 23 having a drive pulley 24 including a set of blades 25 for providing an air current for cooling the motor. Spindle assembly 18 is of a type as illustrated and described in U.S. Pat. No. 5,305,525, and is mounted on bottom plate 20, having a downwardly projecting spindle portion 26. A driven pulley 27 is mounted on downwardly projecting spindle portion 26, which is drivingly connected to drive pulley 22 by means of a drive belt 28. Downwardly projecting spindle portion 26 further is provided with a collet 29 for detachably securing different tool bits such as router bits and the like.

Spindle assembly 19 generally includes a fixed spindle assembly 19a, a movable spindle assembly 19b and a pneumatic cylinder assembly 19c. Spindle subassembly 19a includes an elongated, tubular housing 30 providing an elongated bore 31. Intermediate the ends of bore 31, the housing is provided with an annular, inwardly projecting collar portion 30a separating an upper, cylindrical bore wall section 31a from a lower, cylindrical bore wall section 31b. Disposed in the upper portion of housing bore 31 is a pair of ball bearings 32 and 33, spaced apart by a cylindrical spacer tube 33. Journaled in bearings 32 and 33 is a tubular spindle 34 having an laterally projecting collar portion 34a adjacent an upper end portion 34b, a lower, externally threaded portion 34c and a cylindrical inner wall 34d provided with a longitudinal key receiving slot 34e.

Figure 5:
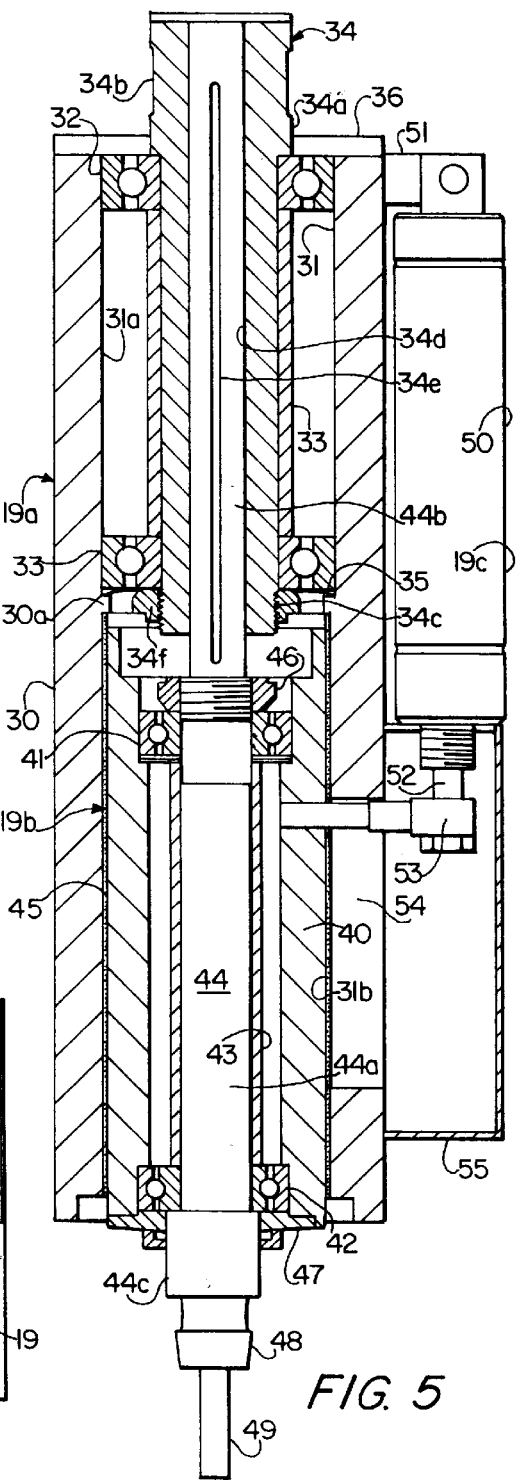
FIG. 5 is an enlarged, cross-sectional view taken along line 5—5 in FIG. 2.

As best shown in FIG. 5, the inner race of bearing 32 engages a lower, annular shoulder of collar portion 34a, tubular spacer 33 engages the inner race of bearing 32, the inner race of bearing 33 engages the lower end of spacer tube 33 and bearings 32 and 33 along with spacer tube 33 are secured on spindle 34 by means of a lock nut 34f threaded onto the lower end of spindle 34 and bearing against the inner race of bearing 33 with a spring washer 35 interposed therebetween. The outer race portion of bearing 33 is supported on an upper, annular seating surface provided by collar portion 30a and the upper end of housing 30 is closed by an annular retainer member 36 bolted to the upper end thereof. A pulley 37 is formed as an integral part of spindle 34, which is drivingly connected to drive pulley 24 by means of a drive belt 38.

The diameter of inner wall 31a is slightly oversized relative to the outside diameters of bearings 32 and 33 to permit the bearings to be press-fit onto the spindle and then the spindle and mounted bearings to be inserted in the upper end of bore 31 and secured in place by a metal-to-metal bonding material.

Movable spindle subassembly 19b includes a tubular housing 40, a pair of roller bearings 41 and 42 mounted within housing 40 and spaced apart by a tubular spacer 43 and a spindle 44 journaled in bearings 41 and 42. Tubular housing 40 is provided with an outer, cylindrical wall disposed coaxially relative to spindle 34 and is disposed in sliding engagement with a cylindrical bearing surface of a lining 45 of a structural polymer formed on inner cylindrical wall 31b of housing bore 31. The axial bore in tubular housing 40 also is formed with enlarged sections in the end portions thereof providing bearing seats in which the outer races of bearings 41 and 42 are seated.

Spindle 44 includes a lower section 44a journaled in bearings 41 and 42 and in upper guide section 44b received within tubular spindle 34, having a key received within longitudinal key slot 34e to permit spindle 44 to be displaced axially relative to spindle 34 and cause movable spindle 44 to rotate with spindle 34. Spindle 44 is secured in bearings 41 and 42 by means of a lock nut 46 threaded onto a threaded upper portion of spindle section 44a and engaging the inner race of roller 41, and an annular retainer member 47 mounted on the lower end of tubular housing 40 and engaging the underside of bearing 42. The lower, downwardly projecting end of movable spindle section 44a is provided with an enlarged portion 44c on which there is provided a collet 48 for holding a working tool 49.

As with bearings 32 and 33, the bearing seats of bearings 41 and 42 are formed slightly oversized relative to the outer diameters of the bearings and the outer races thereof are secured to their respective bearing seats by means of a metal-to-metal bonding material.

Pneumatic cylinder assembly 19c is of a conventional construction including a cylinder portion 50 connected at an upper end thereof to a bracket 51 secured to housing 30, and an extendable rod portion 52 having an eye bolt 53 secured on the lower, free end thereof, extending through a longitudinally disposed slot 54 in housing 30 and threaded into an opening provided in housing 40. It will be appreciated that by extending and retracting rod portion 52 of the pneumatic cylinder assembly, spindle subassembly 19b will be caused to displace axially relative to spindle 34. The area movement of the lower end of rod portion 52 and slot 54 are closed by a cover member 55.

In the assembly of the unit as shown in FIG. 5, fixed spindle subassembly 19a is first assembled, movable spindle subassembly 19b is then assembled and inserted in the fixed spindle subassembly, liner 45 is formed to provide the bearing surface for the movable spindle subassembly and then the pneumatic cylinder assembly is attached.

In assembling subassembly 19a, bearing 32 is first press-fit onto spindle 34, tubular spacer 33 is mounted on spindle 34, engaging the inner race of roller bearing 32, bearing 33 is press-fit onto the lower end of spindle 34 so that the inner race thereof engages the end of spacer tube 34, washer 35 is applied and then lock nut 34f is threaded onto the lower end of the spindle to secure the bearings in place. The spindle and bearing assembly is then inserted into the upper end of housing bore 31 and the outer races of bearings 32 and 33 are adhesively secured to their bearing seats by means of a metal-to-metal bonding material. Any suitable metal-to-metal bonding material can be used for securing bearings 32 and 33 to housing 30. A metal-to-metal bonding material found to be suitable for this purpose is manufactured and sold by the Loctite Corporation of Newington, Conn., under the trademark RC/620 RETAINING COMPOUND. By first press-fitting bearings 32 and 33 on spindle 34 and then securing the outer races of the bearings to housing 30, the axial alignment of spindle 34 relative to the bearings in which it is journaled is assured thus precluding any undue wear of the bearings due to misalignment.

Subassembly 19b is preassembled by first press-fitting bearing 42 onto spindle section 44a, up against enlarged portion 44c, applying spacer tube 43 on spindle section 44a, inserting such section through the lower end of tubular housing 40 so that bearing 42 becomes seated in the lower end thereof, passing bearing 41 onto spindle section 44b and press-fitting it onto the upper end of spindle section 44a where it becomes seated in the enlarged bore section of the tubular housing, applying lock nut 46 and then adhesively securing the outer races of bearings 41 and 42 to their respective bearing seats in tubular housing 40. A bonding material similar to the material used for securing bearings 32 and 33 is used to secure bearings 41 and 42. By mounting bearings 41 and 42 on spindle section 44a and then securing the outer races of the bearings to tubular housing 40 assures the axial alignment of spindle 44 relative to bearings 41 and 42 thus preventing undue wear of such bearings due to misalignment.

With fixed spindle subassembly 19a thus assembled and movable spindle subassembly 19b thus preassembled, a key is provided on spindle section 44b, a release agent is applied to the outer cylindrical surface of housing 40 and subassembly 19b is inserted through the lower end of housing 30 so that spindle section 44b is received within spindle 34 with the key thereof received within key slot 34e, and tubular housing 40 is spaced from cylindrical wall section 31b to provide an annular space therebetween. With the two subassemblies thus positioned, a structural polymer composition in a viscous, uncured condition is injected into the annular space between housings 30 and 40 to form a liner on wall section 31b providing a cylindrical bearing surface slidably engaged by tubular housing 40. A suitable structural polymer for such purpose has been found to be a polymer manufactured and sold by Diamant Metallplastic GmbH of Monchengladbach, Germany under the trademark MOGLICE. Such material is an epoxy based structural polymer which may be used in the form of a fluid having the consistency of gear oil or in the form of a putty. Preferably, the material is used in the form of a fluid and is injected into the annular space between the housing components to force out the air in such space thus preventing any air pockets or voids along the surface of the housing to which it adheres, and precisely replicate the surface of the movable housing member. Upon the curing of the polymer, there will be provided a sliding surface replicating the outer surface of housing member 40, having the structural integrity and dimensional stability of a machined metallic surface. To enhance the lubricity of the surface, the structural polymer used may be formulated with a lubricant such as molybdenum disulfide.

By inserting spindle section 44b into spindle 34 and then forming lining 45 providing the cylindrical bearing surface for housing 40, not only is an expensive machining operation for forming the bearing surface for housing 40 eliminated but the axial alignment of movable spindle subassembly 19b with spindle subassembly 19a is positively assured.

The unit may then be completed by attaching cylinder assembly 50 to housing 30, inserting eye bolt 53 through slot 54 and threading it into the threaded opening in housing 40 with the eye portion thereof aligned with the end of rod portion 52, inserting a retainer bolt through the eye of eye bolt 53 and threading it into the end of the rod portion of the cylinder assembly, and then applying cover 55 and retainer members 36 and 47.

The toolhead assembly shown in FIGS. 2 through 4 may be assembled and mounted on the gantry of a machine as shown in FIG. 1 simply by mounting support member 16 on toolhead support assembly 14, mounting motor 17 and spindle assemblies 18 and 19 on the support member, applying drive belts 28 and 38 and connecting the electrical and air lines to the motor and cylinder assembly 50.

In the design of the assembly shown in FIG. 5 and in the positioning of the assembly on support member 16, the extension of spindle 44 is made sufficiently long and the assembly is mounted on support member sufficiently high relative to the position of spindle assembly 19 so that when spindle assembly 18 is being operated to perform a work function and spindle 44 is in its retracted position, spindle assembly 19 will not interfere with the operation of spindle assembly 18, and when spindle assembly 19 is being operated to perform a work function with spindle 44 in its extended position below the level of the tool provided on spindle assembly 18, spindle assembly 18 will not interfere with the operation of spindle assembly 19.

With the toolhead assembly as described, it will be appreciated that a machine tool of the type as shown in FIG. 1 may be employed with two separate working tools without the use of an additional electric motor and frequency converter therefor or any type of complicated tool changer or turret arrangement. It further will be appreciated that with the construction of spindle assembly 19 as described, there is provided a spindle assembly which not only eliminates an expensive machining operation to provide the bearing surface for the movable spindle sub-assembly but provides a precise axial alignment of all of the components thus eliminating any undue wear and short service life of the bearings and spindles.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof as limited solely by the appended claims.

I claim:

1. A method of fabricating a spindle assembly comprising:
providing a housing having an elongated bore therein;
forming a first spindle subassembly by mounting a pair of spaced ball bearings on a tubular spindle having rotational motion transferring means;
positioning said first spindle subassembly in said housing bore;
forming a second spindle subassembly by positioning a spindle having a guide portion provided with a rotational motion transferring means operatively connectable to said rotational motion transferring means of said tubular spindle, in a tubular housing with the guide portion thereof projecting therefrom, and mounting a pair of ball bearings on said second named spindle, between said second named spindle and said tubular housing;
positioning said second spindle subassembly into said housing bore with said projecting guide portion of said second named spindle being inserted in said tubular spindle, said rotational motion transferring means of said second named spindle being operatively connected to said rotational motion transferring means of said tubular spindle to permit axial displacement of said second spindle subassembly relative to said first spindle subassembly and rotational movement of said second spindle subassembly with said first spindle subassembly, and said tubular housing being spaced from a wall of said housing bore to provide an annular space therebetween;

forming a lining in said housing bore providing a bearing surface for said tubular housing by injecting a precured structural polymer into said annular space between said first named housing and said tubular housing;

allowing said structural polymer to cure, forming a lining adhered to said first named housing and forming a bearing surface replicating the outer surface of said tubular housing; and attaching to said first named housing and tubular housing means for displacing said tubular housing relative to said first named housing.

2. A method according to claim 1 including adhesively bonding the outer races of said ball bearings mounted on said tubular spindle to said first named housing after said roller bearings have been mounted on said tubular spindle to assure coaxial alignment of said tubular spindle and said bearings mounted thereon.

3. A method according to claim 1 including adhesively bonding the outer races of said roller bearings mounted on said second named spindle to said tubular housing after said ball bearings have been mounted on said second named spindle to assure coaxial alignment of said second named spindle and said bearings mounted thereon.

4. A method according to claim 1 including applying a release agent on an outer cylindrical surface of said tubular housing prior to injecting said structural polymer in said annular space to form said lining.

5. A method according to claim 1 including forming oversized seats for said bearings on said first named housing and said tubular housing, and applying a bonding material to said bearing seats for securing the outer race portions of said bearings thereto.

6. A method according to claim 5 wherein said bonding material comprises a metal-to-metal bonding material.

* * * * *